No. 802,618. PATENTED OCT. 24, 1905.
B. E. WILLIAMS.
SOLDERING IMPLEMENT.
APPLICATION FILED NOV. 4, 1904.
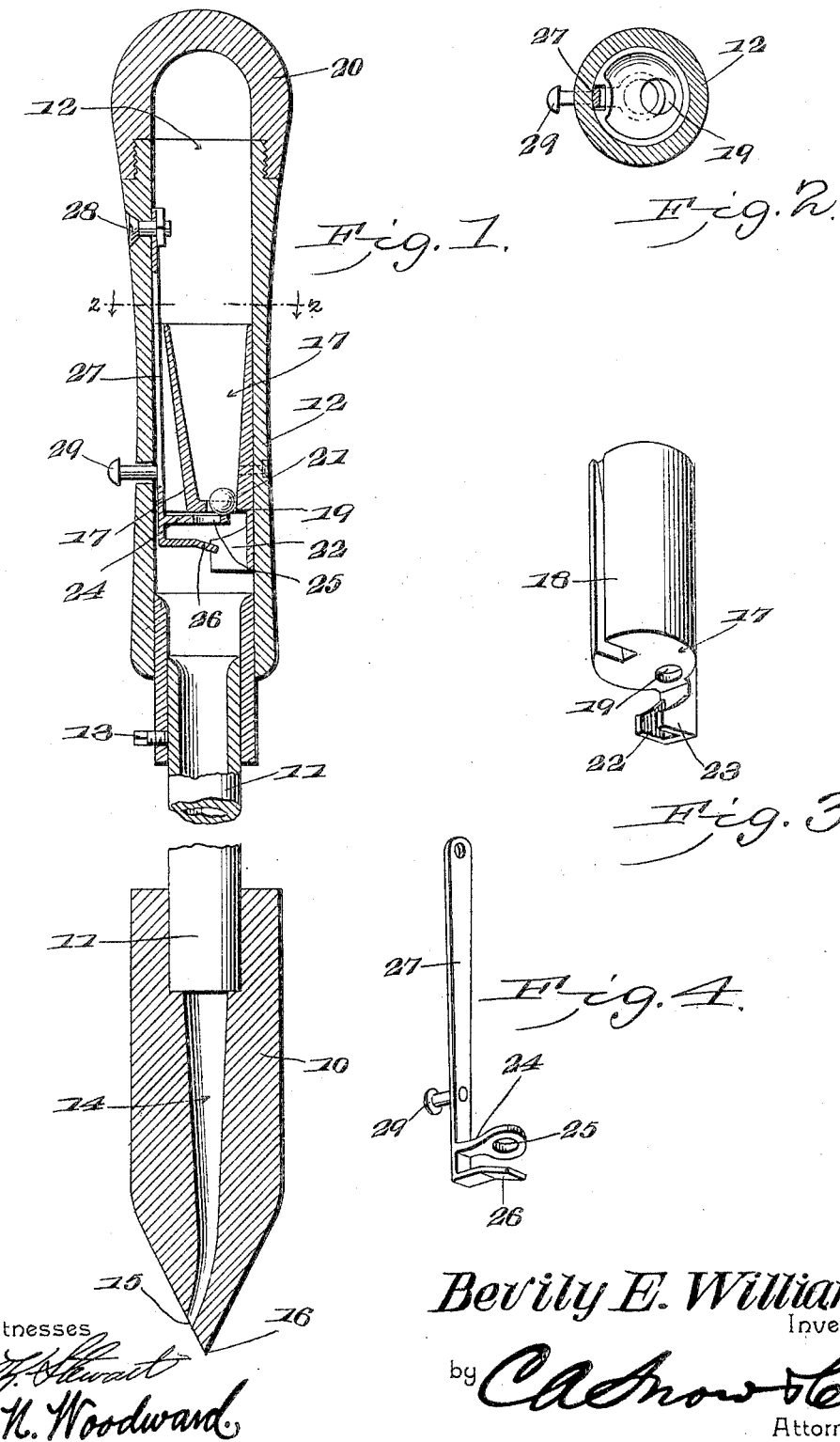
Witnesses
E. F. Stewart
C. N. Woodward
Bevily E. Williams,
Inventor
by C. A. Snow & Co.
Attorneys

UNITED STATES PATENT OFFICE.

BEVILY E. WILLIAMS, OF WOODVILLE, MISSISSIPPI.

SOLDERING IMPLEMENT.

No. 802,618.     Specification of Letters Patent.     Patented Oct. 24, 1905.

Application filed November 4, 1904. Serial No. 231,405.

*To all whom it may concern:*

Be it known that I, BEVILY E. WILLIAMS, a citizen of the United States, residing at Woodville, in the county of Wilkinson and State of Mississippi, have invented a new and useful Soldering Implement, of which the following is a specification.

This invention relates to implements for applying soldering metal or metallic compounds, and has for its object to produce a simply-constructed and efficient implement of this character wherein the soldering metal is supplied as fast as required to the soldering-point and melted as it is applied.

Another object of the invention is to produce an implement of this class wherein "soldering-points" of different sizes or forms may be quickly connected to the solder-supplying portion of the apparatus without structural changes in the same.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a longitudinal sectional elevation. Fig. 2 is a transverse section on the line 2 2 of Fig. 1. Fig. 3 is a detached perspective view of the shut-off diaphragm and its attachments. Fig. 4 is a detached perspective view of the valve and its operating-spring and stop-plate.

The improved device comprises a soldering or heating point 10, usually of copper or some other body or metal possessing similar qualities and provided with a tubular stock 11 and with a hollow handle 12, secured detachably to the outer end of the stock, as by a set-screw 13, so that points of various sizes or forms may be readily attached when required.

The heating-point is formed with an internal longitudinal aperture 14, preferably reduced at its terminal 15 near the terminal or point 16 of the heating member and communicating with the interior of the tubular stock 11, as shown.

Within the hollow handle 12 a transverse diaphragm 17 is disposed and preferably provided with a shell or shield 18, extending upwardly into the handle and with an aperture 19 through the diaphragm at one side.

The handle is provided with a detachable cover 20 and is designed to hold the supply of soldering metal in the form of shot-like pellets 21, uniform in size and just large enough to pass one at a time through the aperture 19 in the diaphragm.

Depending beneath the diaphragm 17 are spaced guide-wings 22 23, and disposed for movement beneath the diaphragm is a valve member 24, having an aperture 25 for registration with the aperture 19 when the valve is moved laterally of the handle.

Attached to the valve 24 is a stop-plate 26, spaced from the valve and extending partially beneath the aperture therein and operative between the guide-wings 22 23.

Extending from the valve 24 is a spring-bar 27, connected, as by a bolt 28, to the handle 12 and operative by a push-button member 29, extending through the side wall of the handle, so that the spring-bar may be compressed from the exterior of the handle. The spring-bar will thus maintain the valve yieldably in closed position or with the free end transversely of the aperture 19 in the diaphragm 17, and thus prevent the passage of the pellets 21. If now the button 29 be pushed inwardly, the spring-bar and its attached valve and stop-plate will be moved laterally to uncover the aperture 19 in the diaphragm and permit one of the pellets to fall through upon the stop-plate 26 and between the guide-wings 22 23, where it remains until the push-button is released, when the reaction of the spring-bar will return the valve to its former position and again close the aperture 19 and cut off the passage of any more of the pellets and at the same time release the dropped pellet and permit it to pass through the tubular stock 11 and into the aperture 14 in the heater-point 10 and lodging above the contracted extremity 15 of the latter, where it is held until melted by the heated point 10 and passes thence in that condition upon the work to be soldered. Thus the pellets may be fed to the soldering-point and melted as fast as required by merely pushing upon the button 29 with one of the fingers of the hand grasping the handle 12, as will be obvious.

The diaphragm 17 and its attachments and the valve 24 and its attachments are readily removable, so that diaphragms and valves having apertures for different sizes of pellets may be disposed in the handle member to adapt the implement to different kinds of work.

The diaphragm 17 and its shell 18 and guideways 22 23 will preferably be in one piece, and the valve 24 and its spaced stop-plate 26 will also preferably be in one piece to reduce the expense and increase the strength and stability of the implement.

The parts may be of any size or of any suitable material, and the implement is capable of employment wherever ordinary implements of this character are employed, but with increased convenience and economy of time, labor, and the amount of soldering metal used, as will be obvious.

Having thus described the invention, what is claimed is—

1. A soldering implement comprising a heating member having a longitudinal aperture terminating near its point, a tubular stock connected to said heating member and communicating with the aperture in the same, a hollow handle connected to said stock for holding pellets of soldering metal, a spring-controlled valve operating transversely of said handle for consecutively releasing said pellets for discharging into said tubular stock and heating-member aperture, and means for operating said valve from the exterior of said handle.

2. A soldering implement comprising a heating member having a longitudinal aperture terminating near its point, a tubular stock connected to said heating member and communicating with the aperture in the same, a hollow handle connected to said stock for holding pellets of soldering metal, a diaphragm disposed transversely of said handle and provided with an aperture corresponding to a single pellet, a valve operative beneath said diaphragm for alternately closing and opening said aperture, and means for operating said valve exteriorly of said handle.

3. A soldering implement comprising a heating member having a longitudinal aperture terminating near its point, a tubular stock connected to said heating member and communicating with the aperture in the same, a hollow handle connected to said stock for holding pellets of soldering metal, a diaphragm disposed transversely of said tubular handle and provided with an aperture corresponding to a single pellet, a valve operative beneath said diaphragm, and a stop-plate spaced from said valve and partaking of its movement for receiving the pellets passing the valve and retaining them during the time the valve is open.

4. A soldering implement comprising a heating member having a longitudinal aperture terminating near its point, a tubular stock connected to said heating member and communicating with the aperture in the same, a hollow handle connected to said stock for holding pellets of soldering metal, a diaphragm disposed transversely of said handle and provided with an aperture corresponding to a single pellet, a valve operative beneath said diaphragm and provided with an aperture for registration with the aperture in said diaphragm when the valve is actuated, a spring connected to said valve for maintaining the same yieldably closed, and a push-button member connected to said spring through the wall of said handle member for compressing the spring and operating the valve exteriorly of the handle member.

5. A soldering implement comprising a heating member having a longitudinal aperture terminating near its point, a tubular stock connected to said heating member and communicating with the aperture in the same, a hollow handle connected to said stock for holding the pellets of soldering metal, a diaphragm disposed transversely of said handle and provided with an aperture corresponding to a single pellet, a valve operative beneath said diaphragm and provided with an aperture for registration with the aperture in said diaphragm when the valve is actuated, a stop-plate attached to said valve and spaced from the aperture in the same, a spring connected to said valve for maintaining the same yieldably closed, and a push-button member connected to said spring through the wall of said handle member for compressing the spring and operating the valve exteriorly of the handle member.

6. A soldering implement comprising a heating member having a longitudinal aperture terminating near its point, a tubular stock connected to said heating member and communicating with the aperture in the same, a hollow handle connected to said stock for holding the pellets of soldering metal, a diaphragm disposed transversely of said handle and provided with an aperture corresponding to a single pellet, and with spaced guide-wings depending from said diaphragm, a valve operative beneath said diaphragm for alternately opening and closing said aperture and carrying a stop-plate spaced therefrom and operative between said guard-wings.

In testimony that I claim the foregoing as my own I have hereto affixed my signature in the presence of two witnesses.

BEVILY E. WILLIAMS.

Witnesses:
Z. GAULDEN,
W. R. WILLIAMS.